This invention relates to the preparation of high molecular weight polyoxymethylene from alcoholic solutions of formaldehyde.

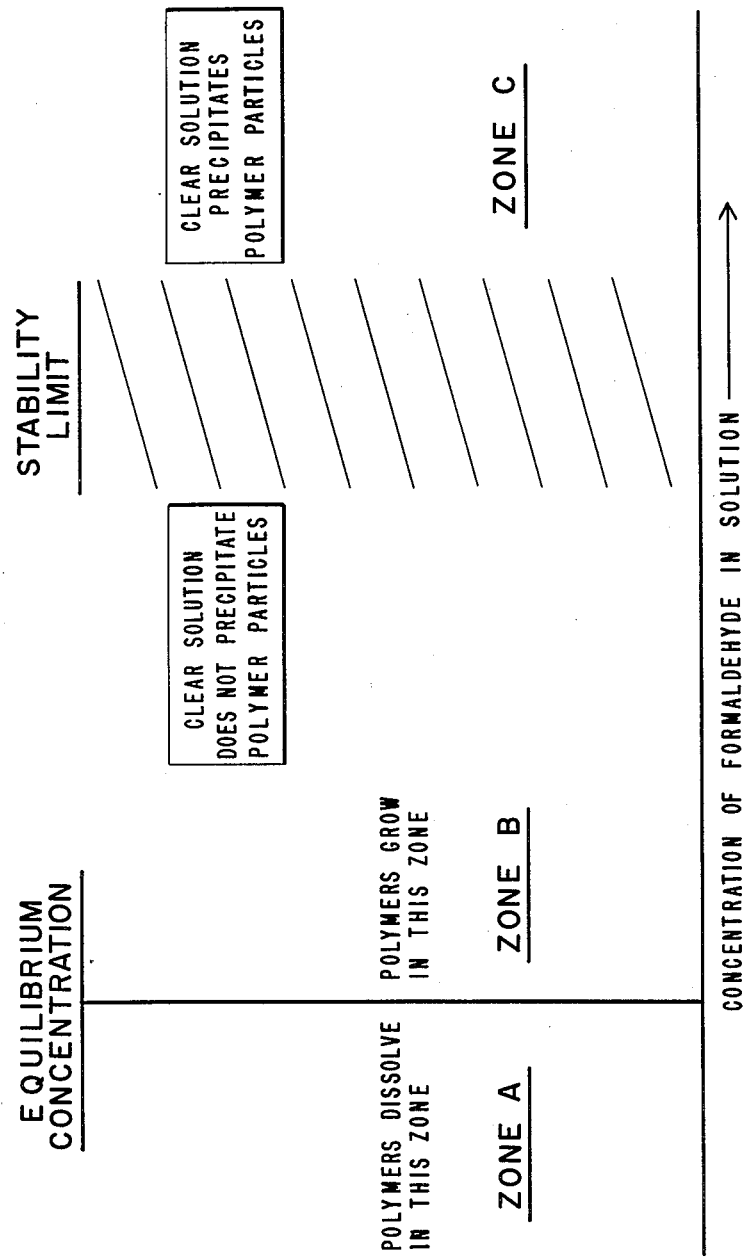
INVENTORS
NORTHROP BROWN
DENNIS LIGHT FUNCK
CARL EARLE SCHWEITZER
ATTORNEY 3,000,860
POLYMERIZATION OF ALCOHOL SOLUTIONS OF FORMALDEHYDE TO PRODUCE HIGH MOLECULAR WEIGHT POLYOXYMETHYLENE
Northrop Brown, Dennis Light Funck, and Carl Earle Schweitzer, Wilmington, Del., assignors to E. I. du Pont de Nemours and Company, Wilmington, Del., a corporation of Delaware
Filed Dec. 3, 1957, Ser. No. 700,338
9 Claims. (Cl. 260—67)

In U. S. Patent 2,768,994 issued to R. N. MacDonald on October 30, 1956, there is described and claimed a high molecular weight polyoxymethylene which is characterized as having a "degree of toughness" of at least 1, or as having a reaction rate constant for thermal degradation at 222° C. of less than 1% by weight per minute. These characterizations, described in greater detail in MacDonald's patent, differentiate the claimed polyoxymethylene from any prior art polyoxymethylene such as that described in H. Staudinger in "Die Hochmolekularen Organischen Verbindungen," Julius Springer, Berlin (1932), by J. F. Walker in "Formaldehyde," 2d Edition, Reinhold Publishing Corp., New York (1953), or by U.S. Patent 2,296,249 issued to P. R. Austin and C. E. Frank on September 22, 1942. The procedures, described in these prior art references, for preparing polyoxymethylenes involve a high degree of purification of the formaldehyde monomer, followed by polymerization of the monomer, with or without a catalyst, in the presence of an inert liquid organic medium, such as hydrocarbon or an ether.

In copending application Serial No. 700,339, filed by N. Brown, D. L. Funck, and C. E. Schweitzer on December 3, 1957, there is disclosed and claimed a process and product formed by polymerizing formaldehyde from aqueous solutions thereof. The polymer produced by this process is a polyoxymethylene glycol which is substantially 100% crystalline.

The prior art relating to the polymerization of formaldehyde from alcoholic solutions is restricted to the formation of paraformaldehyde by precipitation, and to the use of methanol in aqueous solutions of formaldehyde to stabilize those solutions against precipitation of paraformaldehyde.

It has now been found that the formaldehyde in an alcohol solution of formaldehyde may be polymerized to a high molecular weight polyoxymethylene. The product is not a polyoxymethylene glycol, but instead is a polyoxymethylene chain having a hydroxyl group satisfying one terminal valence of the polymer chain and an alkoxy group, corresponding to the alcohol solvent employed in the polymerization process, satisfying the other terminal valence of the polymer chain. It is, of course, understood that the polymer chain is a series of oxymethylene groups, and, therefore, one end of the chain will be a methylene ($CH_2$) radical while the other end of the chain will be an oxygen atom. Thus, by adding a hydrogen to this oxygen atom a hydroxyl group is formed, or, alternatively, by adding an alkyl group to the oxygen atom, an alkoxy group is formed. When it is stated herein that a terminal valence of the polymer chain is satisfied with hydroxyl radical or an alkoxy radical, it is intended to mean that a hydroxyl group or an alkoxy group is an end group of the final polymer product. It is not intended to mean that a hydroxyl group might be added to an oxygen atom at the end of the polyoxymethylene chain such that it would produce a hydroperoxide group.

The polymer of this invention is substantially 100% crystalline, which is in contrast to the crystallinity of 60%–90% of that of polyoxymethylene prepared by the polymerization of anhydrous formaldehyde in a hydrocarbon medium. It is, of course, well known that the crystallinity of a polymeric material may be changed by melting or dissolving the polymer. The crystallinity of the product of this invention is substantially 100% when the product is prepared by the process of this invention, even though the crystallinity may decrease if the product is thereafter melted or dissolved.

It is an object of this invention to provide a process for the preparation of high molecular weight polyoxymethylenes (having a number average molecular weight of at least 15,000) from an alcoholic solution of formaldehyde. It is another object of this invention to prepare completely crystalline high molecular weight polyoxymethylenes, which, after being esterified or etherified, have the toughness and thermal stability properties of those polymers described and claimed in U. S. Patent 2,768,994 issued October 30, 1956, to R. N. MacDonald. Still other objects will be apparent from the more detailed description of this invention which follows.

The above objects are accomplished in accordance with this invention by a process in which polyoxymethylene seed particles are formed spontaneously from a solution of formaldehyde, an alcohol, and a polymerization catalyst, and those seed particles are grown, to a high molecular weight polyoxymethylene in a reaction medium of formaldehyde, an alcohol, and a polymerization catalyst. An organic diluent may be included, if desired, in the above process steps. The formaldehyde concentration and the reaction conditions of temperature and pressure are, at least in part, different in the two steps of the process, the first step requiring that the solution be sufficiently supersaturated with respect to formaldehyde that polyoxymethylene seed particles form spontaneously from the solution, and the second step requiring that the solution containing the seed particles be supersaturated with respect to formaldehyde but at a concentration lower than that at which polyoxymethylene seed particles form spontaneously therein. The catalysts are certain amines, preferably tertiary amines, alone or in combination with certain acids or with certain inert organic liquid diluents. Acid catalysts in the absence of bases cause some polymerization in the process of this invention, but the rate of polymerization in the production of high molecular weight polymers is slower than that attained by use of the catalysts mentioned above, and therefore such acid catalysts are not preferred. By means of this process, polyoxymethylene seed particles may be formed from an alcoholic solution of formaldehyde and grown to a polyoxymethylene having a number average molecular weight of at least 15,000, and preferably at least 30,000. These novel polyoxymethylene products are substantially 100% crystalline, which has never before been known in such high molecular weight polyoxymethylenes.

The general procedure of this process may be understood by reference to FIGURE 1. At any given temperature, an alcoholic solution of formaldehyde assumes the characteristics shown in FIGURE 1. For any given system of formaldehyde and alcohol there is a concentration of formaldehyde at which the system is saturated with respect to formaldehyde. This saturation point is termed the "Equilibrium Concentration" herein. At formaldehyde concentrations below the Equilibrium Concentration (Zone A) polyoxymethylene tends to depolymerize and to dissolve in the alcoholic formaldehyde solution. At concentrations above the Equilibrium Concentration (Zones B and C) solid polyoxymethylene made by this process will grow by the addition of monomeric formaldehyde units when placed in contact with the solution. The area containing concentrations higher than the Equilibrium Concentration is supersaturated with respect to formaldehyde, and is divided into Zone B and Zone C by the "Stability Limit," which is shown as a narrow range of concentration, thus, differing from the more sharply defined Equilibrium Concentration. Above the Stability Limit polyoxymethylene particles form spontaneously from the formaldehyde solution, and to this extent Zone C is an unstable region in which the system is supersaturated with respect to formaldehyde. In Zone B, between the Equilibrium Concentration and the Stability Limit, is a metastable region in which there is no spontaneous formation or nucleation of polymer particles from a clear solution, although once polymer particles have been introduced into Zone B, the polymer molecules in these particles will grow and increase in molecular weight by the addition of new monomer units, and the further the process concentration is above the Equilibrium Concentration, the faster the polymer molecule will grow. There has been observed, however, in Zone B a phenomenon of induced nucleation, whereby new polymer molecules are produced, presumably on the surface of polymer particles present in the reaction medium. The rate of induced nucleation, as well as the rate of molecular growth, increases as the process conditions are set farther and farther above the Equilibrium Concentration. Accordingly, there is an optimum concentration in Zone B where the amount of induced nucleation on polymer particles of any given molecular weight is tolerable as compared to the rate of growth of the polymer molecules in such particles. In the early stages of the process, while the polymer is at a low average molecular weight, a greater amount of nucleation is acceptable since the newly formed polymer molecules do not serious decrease the average molecular weight of the polymer growing in the reaction medium. As the average molecular weight increases, however, it becomes more important to reduce the rate of nucleation so that monomeric formaldehyde units will add to the larger molecules and thus increase the average molecular weight of the polymer growing in the reaction medium, rather than to be employed in the formation of low molecular weight polymers. The rate of induced nucleation may be reduced by adjusting the reaction conditions closer to the Equilibrium Concentration.

The actual numerical values of the formaldehyde conconetrations at the Equilibrium Concentration and the Stability Limit are, of course, dependent upon the temperature, the pressure, and the composition of the reaction medium. At high temperatures, both the Equilibrium Concentration and the Stability Limit are at high concentrations, and, conversely, at low temperatures both are at low concentrations. Thus, if the polymerization system is at a given concentration of formaldehyde, it may be placed anywhere above or below the Equilibrium Concentration or the Stability Limit by merely adjusting the temperature and pressure of the polymerization medium. The temperature, however, has an effect upon the process of this invention in that an increase in temperature favors the production of polymers of higher molecular weight, increases the rate of total polymer formation, and increases the rate of the by-product formation occurring by the reaction of formaldehyde with itself or with other components of the reaction medium. The principal by-products are formate esters.

The increase in the rate of the by-product formation with increasing temperatures is more pronounced than the increase in the rate of polymer formation, and, therefore, it would appear that the disadvantages of high temperature operation outweigh the advantages. It has been found, however, that the employment of certain polymerization systems, explained in more detail hereinafter, reduces the rate of by-product formation without seriously impairing the polymerization rate at these higher temperatures. Accordingly, one important feature of the process of this invention, which was unknown heretofore, is that high process temperatures may be employed successfully. The general range of process temperatures is from 60° C. to 125° C. Higher or lower temperatures may be used by employing superatmospheric or subatmospheric pressures, although atmospheric conditions are preferable. Lower temperatures than 60° C. are operable, but the reaction rates are very slow. When methanol is employed as the principal component of the reaction medium, the process temperature may range from 60° C. to 110° C. at atmospheric pressure, The preferred temperature range is 80° C.–110° C., and the preferred pressure is atmospheric. At atmospheric pressure and at the temperature of 60° C.–110° C., the Equilibrium Concentration might be within the range of about 25%–80% formaldehyde, based on the total weight of alcohol and formaldehyde. These values may vary somewhat depending on the particular alcohol employed. Since some alcohols have more than one hydroxyl, and since the important relationship is the molar ratio of formaldehyde to hydroxyl, the above weight percentages can be translated to an approximate range of 1:1 to 4:1 mols of formaldehyde per mol of hydroxyl. A mol of hydroxyl is intended to mean the molecular weight of the alcohol in question divided by the number of hydroxyl groups per molecule of alcohol. The Stability Limit is at a concentration which normally is about 4%–8% higher in formaldehyde concentration than that of the Equilibrium Concentration. It is understood, of course, that the presence of components other than formaldehyde and alcohol in the polymerization system may cause the Equilibrium Concentration or the Stability Limit to be at a somewhat different concentration than would be the case if those components were absent from the system.

The components of the reaction medium of this polymerization process include a solution of formaldehyde in an alcohol, a growing polyoxymethylene chain as a solid phase, a polymerization catalyst, and, in some cases, a liquid organic diluent. The reaction medium is a dispersion of growing polyoxymethylene molecules in a liquid medium. Whatever combination of components may be employed, the liquid phase of the reaction medium must be homogeneous, and remain as such throughout the reaction period as the polymer chains of the solid polyoxymethylene particles are increasing in molecular weight. The solution of formaldehyde in alcohol which is used in the preparation of the reaction medium is normally one in which the formaldehyde concentration is about 30%–85% by weight, depending on the particular alcohol employed. The solution may contain impurities or by-products derived from formaldehyde, such as water, formate esters, formic acid, and formals, although it is desirable to maintain the concentration of these impurities and by-products, as well as that of other extraneous materials, as low as is consistent with the economics of this process. The formaldehyde concentration of the reaction medium may range from about 25% to about 85% based on the weight of alcohol and formaldehyde. The usual operating range for methanol, for example, is about 55%–80% on the same weight basis.

The alcohol employed as the solvent for formaldehyde in the process of this invention may be any alcohol which is liquid at the reaction conditions and contains no reactive sites, other than hydroxyl groups, which cause any substantial formation of by-products by reaction with formaldehyde. The alcohols which are intended to fall within the scope of this invention include the unsubstituted saturated or unsaturated alkyl alcohols, cycloalkyl alcohols, aralkyl alcohols, heterocyclic alcohols, polyhydric alcohols, and any of such alcohols substituted with relatively inert groups such as a halogen or a nitrile. The unsubstituted alcohols are preferred, particularly the primary or secondary, monohydric or polyhydric, aliphatic alcohols having 1–5 carbon atoms per molecule, methanol being the most desirable because of its processing characteristics. As will become apparent in the succeeding description of this invention, it is not necessary to employ the same alcohol throughout the entire polymerization reaction, nor is it necessary to use a single alcohol at any one time in the polymerization.

The polymerization catalyst is an important feature of this process. The catalyst provides the necessary control over the acidity or basicity of the polymerization medium, and, in addition, provides the catalytic activity for the ionic polymerization which is characteristic of the formation of polyoxymethylene from formaldehyde. There are two general requirements for the catalyst, namely (1) it must form a single phase, liquid solution with the other components of the reaction medium, and (2) it must not form condensation products with formaldehyde and thereby destroy the balance of formaldehyde concentration or otherwise form by-products which alter the reaction conditions such as pH, and catalyst concentration. The latter requirement may be further explained by pointing out that the presence in the reaction medium of carbonyl groups, nitro groups, or active aromatic ring structures results in an irreversible reaction with formaldehyde which may reduce the formaldehyde concentration to an inoperable level. On the other hand, the presence of alcoholic hydroxyl groups does not impair the polymerization process of this invention, even though hemiformals may be formed, since the latter compounds revert to alcohol and formaldehyde easily.

The catalyst in its broadest terms is an amine which resists hydrolysis, is substantially non-reactive with formaldehyde, and has a $pK_b$ of less than 7, and preferably from 3–5. The term "$pK_b$" is the negative logarithm of the dissociation constant of the amine, normally measured at 25° C. on an aqueous solution of the amine at a molal concentration of 0.00001–0.01. Amines containing reactive sites such as a carbonyl group, a nitro group, or an active aromatic ring, are inoperable in this process. The preferred amines are the non-aromatic amines in which each hydrocarbon group bonded to the central nitrogen has 1–10 carbon atoms, and among the types of these amines the tertiary amines are preferred over the secondary or primary amines, and the secondary amines are preferred over the primary amines. Typical amines employed in this invention include the trialkylamines, such as trimethylamine, triethylamine, and trihexylamine; the dialkylamines such as diethylamine, di-n-propylamine, and dioctylamine; the cycloalkylamines, such as cyclohexylamine and dicyclohexylamine; and the heterocyclic amines, such as piperidine, N-ethylpiperidine, morpholine, N-methylmorpholine, pyrrolidine, and N-ethylpyrrolidine.

In order for the polymerization reaction to proceed properly, the reaction medium of alcohol, formaldehyde, and amine catalyst must be at a certain level of acidity. Even though a measurement of pH is not normally associated with a non-aqueous system, it has been found to provide a convenient method of control. The reaction medium should have a pH of 3.5–10, preferably 4.5–8 as measured with a pH meter at 60° C. on a sample of the reaction medium diluted by adding to the sample the same alcohol employed in the reaction medium in an amount equal to 50% of the weight of the original sample. The pH values reported in this description were measured with a Beckman Glass Electrode pH Meter Model H2, although any equivalent pH meter is satisfactory.

The amount of amine employed in the polymerization system may vary from about 0.1%–50% of the total weight of the polymerization medium. Weakly basic amines, such as 2,6-lutidine, may be required in amounts of 30%–50% of the polymerization medium, while amines, such as N-ethylpiperidine, which are more strongly basic, may only be required in amounts of 1%–10%. It is, of course, economical and desirable to employ the least amount of amine which will effectively polymerize the formaldehyde.

A convenient method for adjusting the pH to the desired value is to add an acid to the amine. The acid may be described as one having a $pK_a$ of at least 2. The $pK_a$ is measured as described above with respect to $pK_b$ using the dissociation constant for the acid instead of that for the amine. In the case of an acid having more than one acid hydrogen, the acid falls within the scope of this invention if any of the hydrogens has a $pK_a$ of at least 2. Stronger acids may be present in the polymerization medium without any deleterious effect on the process, so long as the pH and other reaction conditions remain within the operable limits described herein. Strong acids such as hydrochloric acid, trifluoroacetic acid, and fluoroboric acid are outside the above range of $pK_a$. Phenol and similar materials are excluded because of their reactivity with formaldehyde. The preferred acids include phosphoric acid and the unsubstituted aliphatic carboxylic acids having 1–10 carbon atoms. Examples of the preferred amine/acid combinations include trimethylamine/phosphoric acid, N-ethylpiperidine/acetic acid, tributylamine/phosphoric acid, triethylamine/formic acid, and di-n-propylamine/butyric acid.

The proportions of acid to amine which might be employed may vary from an absence of acid to that amount of acid which will reduce the measured pH of the reaction medium to 3.5. The exact amounts of acid will, of course, depend upon the strength of the particular acid employed. The total amount of amine/acid catalyst combination is normally about 0.1–20%, and preferably 1%–10%, by weight of the total reaction medium. The exact amount depends upon the required catalytic activity for promoting polymer growth and the desired acidity of the polymerization medium.

An alternative catalyst modification is an amine in combination with an organic liquid diluent. The amount of amine employed in the polymerization medium may vary, as mentioned above, from about 0.1%–50% by weight of the total polymerization medium, including the diluent, if any. When the amine is a stronger base, it is sometimes advisable to employ a diluent; but, when the amine is a weak base, and, therefore, must be present in large amounts, there is no advantage to be gained by incorporating a diluent. The pH of this reaction medium, employing an amine and an organic liquid diluent, should range from about 8–11.

The organic liquid diluent is a high boiling (at least 100° C.) organic liquid which is completely miscible and non-reactive with the components of the reaction medium. The preferred diluents are the aromatic hydrocarbons, such as toluene and xylene, and the high boiling ethers, such as dioxane, dimethoxytetraglycol, and diethylene glycol diethyl ether. The boiling point of at least 100° C. at atmospheric pressure is important in that the diluent must not be permitted to boil away from the reaction medium at the temperature and pressure employed. The presence of the diluent reduces the rate of by-product formation as well as the polymerization rate, but the effect upon the by-product formation is much more pronounced than that upon the polymerization rate. The amount of diluent may vary from about 25% to about 300% by weight of the solution of formaldehyde in alcohol employed as a part of the polymerization medium. The optimum amount of diluent which is recommended is that which provides the greatest reduction in losses of formaldehyde due to by-product formation, without seriously reducing the polymerization rate. Amounts above 300% by weight of the solution of formaldehyde in alcohol have not been found to offer sufficient advantages to justify the cost of the increased amount of diluent.

Another type of catalyst which has been found to be operable but not preferred is a salt of an inorganic base and any of the above-described acids. This salt must be soluble in the polymerization medium. Examples of such salts include potassium acetate, potassium benzoate, and the naphthenates of the alkali metals and the alkaline earth metals. The concentration of such salts in the polymerization medium may vary from 0.1% to 10% by weight of the polymerization medium, although, in some instances, the upper limit may be the saturation point which might be less than 10%.

For the purpose of illustration, the process of this invention may be conveniently divided into two reaction steps, the first of which deals with the initial stages of the polymerization where a polymer seed is formed or where nucleation occurs, and the second of which deals with the growth of that seed to a high molecular weight polymer having a number average molecular weight of at least 15,000. The step of forming a polymer seed or nucleus is accomplished by adjusting the pressure, temperature, and formaldehyde concentration of a polymerizable starting solution of alcohol, formaldehyde, and catalyst so that the formaldehyde concentration falls in Zone C above the Stability Limit, and thereby becomes a supersaturated solution in the unstable region. In this condition of pressure, temperature, and concentration there is a spontaneous formation of polyoxymethylene seeds or nuclei. The supersaturated solution containing polymer seeds has a cloudy appearance or, in some cases, it becomes a gel. Either of two alternative methods may be employed to produce these seeds—namely, the isothermal method or the low-temperature method. In the isothermal method, the formaldehyde concentration of the starting solution is adjusted such that, at the prevailing conditions of temperature and pressure, the concentration is above the Stability Limit. The catalyst is then added to the supersaturated solution, whereupon polymer seed particles begin to form and grow. As these seed particles form and grow, the formaldehyde concentration of the solution decreases while the reaction temperature is maintained constant. Thus, the concentration moves from Zone C into Zone B of the drawing and approaches the Equilibrium Concentration as more polymer growth occurs.

In the low-temperature method the starting solution, including the catalyst, is prepared at any convenient temperature, after which the temperature of the starting solution is quickly lowered to the extent necessary to place the concentration above the Stability Limit, and thereby the starting solution becomes a supersaturated solution in the unstable region. Polymer seed formation occurs within a short time. The supersaturated solution is then heated to the processing temperature, and, if necessary, additional formaldehyde solution may be added to adjust the formaldehyde concentration of the reaction medium to the omtimum growth point in Zone B between the Equilibrium Concentration and the Stability Limit.

The low-temperature method is preferred, because the reaction time is shorter than that of the isothermal method, and also because the polymer seed from the low-temperature method grows to a desired molecular weight in a shorter time than does that of the isothermal method.

The second step in the polymer formation is the growth of the seed to a high molecular weight polymer. The seed probably has a molecular weight of less than 1000, although it is too unstable to be isolated and characterized. This portion of the process is substantially the same for either type of seed. The seed is maintained in a reaction medium, which normally, although not necessarily, is the same composition as that of the solutions employed in the first step, at a formaldehyde concentration which is between the Equilibrium Concentration and the Stability Limie (Zone B) and at the concentration for optimum growth. In numerical terms, the growth point may be at a formaldehyde concentration of about 0.5%– 7.0% above the Equilibrium Concentration. In general, as the polymer increases in molecular weight, the formaldehyde concentration is moved closer and closer to the Equilibruim Concentration. The entire process, including seed formation, may be a batch or a continuous process. Substantial quantities of water may be present in the reaction medium without impairing any processing feature other than the formaldehpde concentration and the solubility and selectivity of the catalyst.

In both of the above reaction steps, it is important to maintain control over the differences between the actual formaldehyde concentration of the solution or the reaction medium on the one hand, and the Equilibrium Concentration, or Stability Limit, on the other hand. Although the adjustment of pressure affords a means of control over these differences, it is much more convenient to adjust the temperature or the concentration of ingredients in the solution or the reaction medium. A change in temperature shifts the Equilibrium Concentration and the Stability Limit without affecting the actual formaldehyde concentration of the solution or the reaction medium. On the other hand, the actual formaldehyde concentration may be changed by adding formaldehyde or alcohol without shifting the Equilibrium Concentration or the Stability Limit. These two independent methods of control enable the operator to adjust the process conditions quickly, and, thereby, to achieve and to maintain optimum operating conditions.

The product of this process is a high molecular weight polyoxymethylene which has a number average molecular weight of at least 15,000, and preferably at least 30,000, and which is substantially 100% crystalline. This crystallinity is the principal structural feature which distinguishes the product of this invention from that prepared by polymerizing anhydrous formaldehyde in a hydrocarbon reaction medium, the latter type of polyoxymethylene ranging from about 60% to about 90% crystalline. Furthermore, the ease of replacing the end groups with more stable groups on the product of this invention indicates that the polymer chains grow in a more orderly fashion than those prepared from anhydrous formaldehyde, in that the growing ends of the chain are at the outside of the polymer molecule and not buried within a tangled mass of polymer chains.

The product of this process differs from that described and claimed in copending application Serial No. 700,339, filed by N. Brown, D. L. Funck, and C. E. Schweitzer on December 3, 1957, in that the latter is a polyoxymethylene glycol, or, in other words a polyoxymethylene chain in which each of the terminal valences is satisfied by a hydroxyl, while in this process the product is a polyoxymethylene chain in which one terminal valence is satisfied by a hydroxyl radical and the other terminal valence is satisfied by an alkoxy radical. Thus, the formula for the product of the copending application is $$HO(CH_2-O)_nH$$

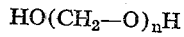

and the formula for the product of the present invention is $$RO(CH_2-O)_nH$$

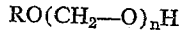

where R is the portion of the alcohol, ROH, employed as the solvent in the polymerization reaction medium. Preferably, R is an alkyl radical having 1–5 carbon atoms per molecule and $n$ is an integer of not less than 500 so that the molecular weight of the polymer is at least 15,000. If methanol were used as the solvent, R would be the methyl radical, $CH_3$.

The polyoxymethylene product of this invention may be esterified or etherified by replacing the one hydroxyl end-group with an ester group or an ether group, respectively. These polyoxymethylenes which have been modified so that the terminal valences of the chain are satisfied by an ether group or an ester group are useful as thermoplastic materials for fabrication into films, sheets, and funicular structures, such as fibers, filaments, bristles, rods, and tubes; and, furthermore, this product may be extrusion-molded or injection-molded into articles, with or without added pigments, stabilizers, antioxidants, or fillers.

In copending application Serial No. 681,188, filed by Dal Nogare and Punderson on August 30, 1957, there is disclosed and claimed a high molecular weight polyoxymethylene diacetate, and in copending application Serial No. 682,325, filed by Brown, Langsdorf and Schweitzer, on September 6, 1957, there is disclosed and claimed a high molecular weight polyoxymethylene diether. The product of the present invention may be esterified so as to produce a polyoxymethylene having one of its terminal valences satisfied by an ether group and the other of its terminal valences satisfied by an ester group. Thus, the general formula of this mixed ether-ester of polyoxymethylene is $$RO(CH_2O)_n\overset{O}{\overset{\|}{C}}R'$$

where R is alkyl or cycloalkyl and R' is alkyl, cycloalkyl, or aryl, and $n$ is an integer of not less than 500 so that the molecular weight of the polymer will be at least 15,000.

In the examples which follow, the above-described process is illustrated. Parts, percentages, and proportions are by weight, unless otherwise noted. The procedures for determining the degree of toughness and the reaction rate constant for thermal degradation are described in U.S. Patent 2,768,994 issued to R. N. MacDonald on October 30, 1956. The procedures for esterifying a terminal hydroxyl of a polyoxymethylene chain are described in copending applications Serial No. 681,188 filed by Dal Nogare and Punderson on August 30, 1957, and Serial No. 443,703 filed by Jenkins and Punderson on July 15, 1954. The procedures for etherifying polyoxymethylene are described in copending application Serial No. 682,325 filed by Brown, Langsdorf and Schweitzer on September 6, 1957.

Number average molecular weight may be measured by the conventional procedure of osmometry. However, it has been found that infrared analysis provides an accurate method of measuring the amount of hydroxyl and the amount of oxymethylene chain which is present in a sample of the polyoxymethylene. After these two amounts have been determined, it is a simple calculation to find the number average molecular weight by knowing that the polymer will have one hydroxyl per chain when a monohydric alcohol is employed in the polymerization system, and two hydroxyls per chain when a dihydric alcohol or water is employed in the polymerization system. The actual procedure employed in measuring the number average molecular weights reported in these examples was to press a film from the polymer to be tested, the film being translucent and crack-free and about 5 mils in thickness, and being pressed at room temperature and at a pressure of about 35,000 p.s.i. The film was then scanned by a Perkin-Elmer Model 21 Spectrophotometer (or its equivalent) equipped with calcium fluoride optics. The absorbance was measured at 2.9 microns (for hydroxyl) and at 2.54 microns for total oxymethylene chain. The base line for the 2.54 band was a line joining the minimum absorbance at 2.1 microns to the minimum absorbance at 2.7 microns. The base line for the 2.9 band was a line joining the minimum absorbance at 2.7 microns with the minimum absorbance at 3.0 microns. The equation for calculating number average molecular weight from these measurements of infrared absorbance is:

$$\overline{M}_n = \frac{x(7850)}{\left(\frac{\text{absorbance at 2.9 microns}}{\text{absorbance at 2.54 microns}}\right)}$$

where $\overline{M}_n$ is the number average molecular weight and $x$ is the number of hydroxyls per polymer molecule.

*Example 1*

A clear solution was prepared at 105° C. containing the following components:

| | Grams |
|---|---|
| Formaldehyde | 722 |
| Methanol | 231.4 |
| N-ethylpiperidine | 29.0 |
| 85% phosphoric acid | 23.6 |

By the sulfite method of analysis, the above solution contained 71.9% by weight formaldehyde. The solution had a pH of 5.2–5.3. A portion (20 ml.) of the above solution was placed in a flask, which in turn was cooled for 5 minutes in a bath maintained at 60° C., followed by 5 minutes in a bath at 85° C. During this period of 10 minutes the clear solution became cloudy because of the precipitation of seed particles of low molecular weight polyoxymethylene. The flask containing the cloudy solution was then placed in a constant temperature bath at 105° C., 400 ml. of the above-described clear solution was added to the flask, and the entire contents were subjected to continuous agitation. The Equilibrium Concentration of this system at 105° C. was 68.7% by weight of formaldehyde.

The flask and its agitated contents were maintained at 105° C. for three days with an analysis being made daily and with the daily addition of a portion of a freshly prepared solution similar to that described above, except that the formaldehyde content was slightly less for each succeeding day's portion.

At the end of the first day, an analysis of a 25 ml. sample of the flask contents indicated that the liquid analyzed 70.7% by weight of formaldehyde and that the solid particles were polyoxymethylene molecules having a number average molecular weight of 21,000 by infrared analysis for hydroxyl groups. The sample is isolated by adding a 25 ml. sample of the flask contents to 10 ml. of hot water, filtering, washing the precipitate with hot water, then with room temperature water, and finally with acetone. The solid precipitate is then dried and analyzed. A freshly prepared solution of the above four ingredients was prepared having the same weight ratio of methanol/N-ethylpiperidine/85% phosphoric acid, but a smaller amount of formaldehyde such that the solution analyzed 71.1% by weight formaldehyde. A volume of 250 ml. of this freshly prepared solution was added to the flask after the 25 ml. sample had been removed for analysis.

At the end of the second day, two samples (200 ml. and 25 ml.) were removed from the flask and analyzed as described above, and the findings indicated that the liquid contained 69.7% by weight of formaldehyde and that the polyoxymethylene molecules had grown to a number average molecular weight of 31,000 and 30,000, as judged by the respective samples. A volume of 400 ml. of a freshly prepared solution of the above four ingredients was then added to the flask. This added solution again contained the same weight ratio of methanol/N-ethylpiperidine/85% phosphoric acid and a smaller amount of formaldehyde such that the added solution analyzed 69.7% by weight of formaldehyde.

At the end of the third day the liquid in a 25 ml. sample analyzed 68.8% by weight of formaldehyde and the polyoxymethylene molecules had a number average molecular weight of 33,000. The entire contents of the flask were removed and the polymer particles isolated in the amount of 17.7 grams, and the number average molecular weight of the polymer was 34,000. A sample of this polymer was acetylated by treatment with acetic anhydride in the presence of sodium acetate as a catalyst. The acetylated product, by analysis, had a number average molecular weight of 36,000 and reaction rate constant for thermal degradation at 222° C. of 0.11% by weight per minute. Several portions of the acetylated product were pressed into films 3.0–3.7 mils in thickness and found to have a degree of toughness of at least 1. Some of these portions of acetylated polymer were treated with 1% by weight of a polyamide as a thermal stabilizer and 0.2% by weight of a phenolic antioxidant prior to being pressed into films, and the resulting film also had a degree of toughness of at least 1. One portion of the polyoxymethylene was alkylated rather than acetylated. The alkylation was accomplished by treating the polymer with methylal and sulfuric acid, followed by removal of any unreacted polymer. The reaction rate constant for thermal degradation at 222° C. for this alkylated polymer was 0.37% by weight per minute, and films 3–6 mils in thickness had a degree of toughness of at least 1.

*Example 2*

A clear solution was prepared at about 100° C. containing the following ingredients:

| | Grams |
|---|---|
| Formaldehyde | 209 |
| Methanol | 70.6 |
| Xylene | 211.9 |
| N-ethylpiperidine | 26.5 |

The analysis of this solution by the sulfite method shows 40.4% by weight formaldehyde. The solution had a pH of about 8.5–9.0. A 25 ml.-portion of this solution was placed in a flask, which, in turn, was placed in a bath at 60° C. for 30 minutes, during which time the solutions became somewhat cloudy due to the precipitation of seed particles of low molecular weight polyoxymethylene. The flask and its contents were then placed in a constant temperature bath maintained at 100° C., and the contents were continuously stirred. The Equilibrium Concentration of this system at 100° C. was 36.6% by weight of formaldehyde. A second solution in the amount of 200 ml., containing the same weight ratio of methanol/xylene/N-ethylpiperidine as in the original solution, and containing, by analysis, only 37.45% by weight formaldehyde, was prepared and added to the flask containing the original solution and the seed particles. After a period of 0.91 day there was recovered from the slurry in the flask 1.14 grams of a polyoxymethylene having a number average molecular weight of 11,000 as determined by infrared analysis for hydroxyl groups.

The above-described polyoxymethylene, in the amount of 1.04 grams was placed in a flask and 200 ml. of a freshly prepared solution of the above four ingredients was added. This solution analyzed 37.7% formaldehyde and contained methanol, xylene, and N-ethylpiperidine in the same weight ratio as described above. After an additional 0.93 day at 100° C., the polymer, in the amount of 1.6 grams, was isolated and found to have a number average molecular weight of 17,000 by infrared analysis.

This latter polymer in the amount of 0.45 gram was placed in a flask along with 25.46 ml. of a freshly prepared solution analyzing 38.0% by weight formaldehyde and containing methanol, xylene, and N-ethylpiperidine in the same weight ratio as given above. After an additional period of 1.03 days at 100° C., the polymer was isolated and found to weigh 0.76 gram and to have a number average molecular weight of 23,000 by infrared analysis.

This latter polymer, in the amount of 0.27 gram, was placed in a flask along with a freshly prepared solution analyzing 37.6% by weight formaldehyde and containing the same weight ratio of methanol/xylene/N-ethylpiperidine. After an additional 0.96 day at 100° C., the polyoxymethylene was isolated and found to weigh 0.37 gram and to have a number average molecular weight of 26,000 by infrared analysis.

*Example 3*

A clear solution was prepared containing the following ingredients:

| | Grams |
|---|---|
| 54.5% solution of formaldehyde in sec.-butyl alcohol | 231.5 |
| Sec.-butyl alcohol | 8.0 |
| N-ethylpiperidine | 13.6 |
| Glacial acetic acid | 9.6 |

The 54.5% solution of formaldehyde in sec.-butyl alcohol was prepared by bubbling anhydrous formaldehyde into sec.-butyl alcohol at 80°–100° C. The analysis of the solution, after the addition of N-ethylpiperidine and acetic acid, indicated a formaldehyde content of 48.0% by weight. The final solution had a pH of 7.2. A 10 ml. portion of this solution was placed in a flask, which, in turn, was placed in a constant temperature bath. The flask and its contents were maintained at 25° C. for 20 minutes, at 60° C. for an additional 25 minutes, and, finally, at 80° C. for an additional 30 minutes. During this treatment the clear solution turned somewhat cloudy due to the precipitation and growth of polyoxymethylene particles of low molecular weight. The flask and its contents were then placed in a bath at 95° C. and 60 ml. of the above-described clear solution was added. There also was added 3.7 ml. of a solution of sec.-butanol, N-ethylpiperidine, and glacial acetic acid in the same weight proportions as given above with respect to the clear solution. The formaldehyde concentration of the final contents of the flask was calculated to be 46.0% by weight, exclusive of the formaldehyde forming the polyoxymethylene chains. The Equilibrium Concentration of this system at 95° C. was 42.0% by weight of formaldehyde.

After 2.88 days at the above temperature, the liquid in the flask analyzed 44.3% by weight formaldehyde. The contents of the flask were treated so as to isolate the polymer particles, in the same manner as described in Example 1 except that alcohol was used in place of water. The solid product weighed 1.001 grams and had a number average molecular weight of 18,000 by infrared analysis. The recovery and isolation of the polymer were accomplished at room temperature by adding 3 volumes of dioxane to the volume of the flask contents, filtering, washing twice with a 1:1 volume ratio of sec.-butanol:dioxane, washing twice with acetone, and drying. This product was acetylated by treatment with acetic anhydride in the presence of sodium acetate and the acetylated product exhibited a reaction rate constant for thermal degradation at 222° C. of 0.13% by weight per minute.

*Example 4*

A clear solution was prepared from methanol/N-ethylpiperidine/acetic acid in weight proportions of 1.0/0.16/0.064, and containing 69.05% by weight of dissolved formaldehyde. This solution had a pH of 7.2. This solution, in the amount of 50 ml., was agitated gently at 55° C. for 45 minutes, by which time the solution had turned somewhat cloudy. To this solution there was added 431 grams of the original solution of methanol, N-ethylpiperidine, acetic acid, and formaldehyde. The resultant mixture, which analyzed 68.75% formaldehyde, was agitated gently for 0.95 day at 95° C. The product of this step was 38.1 grams of polyoxymethylene dispersed in the above solution which analyzed 66.5% formaldehyde. The Equilibrium Concentration of this solution at 95° C. is 65.8% formaldehyde. The polyoxymethylene was found to have a number average molecular weight of 12,000.

One portion (0.91 gram) of the above polyoxymethylene was further processed in 53.1 grams of a solution containing the same weight proportions of methanol/N-ethylpiperidine/acetic acid and containing 72.8% by weight dissolved formaldehyde. The processing consisted of gentle agitation for 0.95 day at 105° C. The Equilibrium Concentration for this solution was 68.8% by weight of formaldehyde. The product of this step weighed 4.028 grams, and was a polyoxymethylene having a number average molecular weight of 21,000.

Another portion of the above polyoxymethylene (number average molecular weight of 12,000), weighing 0.91 gram, was further processed in a solution of formaldehyde containing methanol, N-ethylpiperidine, and acetic acid in weight proportions of 1.0/0.12/0.0848. The weight of this solution before addition of the polymer was 53.1 grams and it analyzed 73.2% formaldehyde. The entire mixture of polymer and solution was gently agitated for 0.95 day at 105° C. The Equilibrium Concentration for this solution was 69.4% by weight of formaldehyde. The product which was recovered from this treatment weighed 3.446 grams and was a polyoxymethylene having a number average molecular weight of 22,000.

*Example 5*

A polyoxymethylene having a number average molecular weight of 13,000 was prepared from a methanolic solution of formaldehyde containing methanol, N-ethylpiperidine, and acetic acid essentially the same as described in Example 4. A portion (0.91 gram) of this polyoxymethylene was placed in 53 grams of a formaldehyde solution analyzing 71.8% by weight formaldehyde and containing methanol, N-ethylpiperidine, and polyphosphoric acid in weight proportions of 1.0/0.12/0.069. (The polyphosphoric acid was made by absorbing 1 mol of phosphorus pentoxide in 2 mols of phosphoric acid.) This latter solution had a pH of about 6.5. This mixture was gently agitated for 1.04 days at 105° C., at the end of which time the product was isolated and found to weigh 3.848 grams and to be a polyoxymethylene having a number average molecular weight of 24,000. The Equilibrium Concentration for this mixture at 105° C. was 67.8% by weight of formaldehyde.

*Example 6*

A formaldehyde solution was prepared containing 74.5% by weight formaldehyde dissolved in methanol containing trimethylamine and 85% phosphoric acid in weight proportions of 1 part methanol/0.0625 part trimethylamine/0.0535 parts 85% phosphoric acid. This solution had a pH of about 6.0. A portion (10 ml.) of the above solution was maintained at 60° C. for 3 minutes and then at 85° C. for an additional 5 minutes. After this period of processing, minute particles of polyoxymethylene had formed so as to change the previously clear solution to a slightly cloudy solution. To this slightly cloudy solution was added 100 ml. of the above-described clear solution of formaldehyde, methanol, trimethylamine, and 85% phosphoric acid. The entire mixture, having a formaldehyde concentration of 74.5%, was gently agitated at 105° C. for 1.0 day. The Equilibrium Concentration for this mixture was 71.9% by weight of formaldehyde. The polyoxymethylene product was isolated and found to weight 7.679 grams and to have a number average molecular weight of 22,000.

*Example 7*

A solution of formaldehyde was prepared in a mixture of methanol, 2-dimethylaminoethanol, and dioxane, in weight proportions of 1 part methanol/0.73 part 2-dimethylaminoethanol/3.0 parts dioxane. The formaldehyde weight concentration was 46.3%. This solution had a pH of 8.5–9.0. This mixture, in the amount of 319.5 grams, was agitated for 2.8 days at 80° C. The Equilibrium Concentration of this mixture at 80° C. was 37.8% by weight of formaldehyde. At the end of the 2.8 days, the polyoxymethylene was isolated and found to weight 42.1 grams and to have a number average molecular weight of 11,000.

In a second processing step, a portion (1.82 grams) of the above-described polyoxymethylene was added to 100 ml. of a solution of 44.1% by weight of formaldehyde in a mixture of methanol, 2-dimethylaminoethanol, and dioxane in the same weight proportions as given above. This mixture was agitated for 0.8 day at 90° C., at which temperature the Equilibrium Concentration of the mixture was 40.2% by weight of formaldehyde. The product of this second step was isolated and found to weight 3.462 grams and to have a number average molecular weight of 14,000.

In a third and final processing step, a portion (0.91 gram) of the above-described polyoxymethylene having a number average molecular weight of 14,000 was placed in 58 ml. of a solution of 43.0% by weight of formaldehyde in a mixture of methanol, 2-dimethylaminoethanol, and dioxane in the same weight proportions as given above. This mixture was agitated for 1.97 days at 90° C. (Equilibrium Concentration=40.2% by weight of formaldehyde. The polyoxymethylene product was isolated and found to weight 1.904 grams and to have a number average molecular weight of 19,000.

*Example 8*

A solution was prepared containing 68.4% by weight of formaldehyde dissolved in a mixture having the weight proportions of 1.0 part ethylene glycol/0.12 part N-ethylpiperidine/0.0848 part glacial acetic acid. This solution had a pH of about 7.2. A portion (5 ml.) of this solution was agitated at 60° C. for 11 minutes and then at 85° C. for 10 additional minutes, at the end of which time a slight cloudiness appeared in the solution. To this slightly cloudy solution there was added 100 ml. of the first-mentioned solution of formaldehyde, ethylene glycol, N-ethylpiperidine, and acetic acid having a formaldehyde concentration of 68.4%. This mixture was agitated at 105° C. for 0.91 day. The polyoxymethylene product from a 25 ml. sample of the mixture weighed 1.471 grams and had a number average molecular weight of 27,000.

The remaining portion of the mixture contained about 6.18 grams of the product polymer, had a volume of about 80 ml., and had a concentration of 66.9% formaldehyde. This remaining portion was agitated for 1.03 days at 105° C. The polyoxymethylene isolated from a 25 ml. sample of this mixture weighed 2.330 grams and had a number average molecular weight of 35,000.

After the preceding steps, the final remaining portion contained 9.79 grams of polyoxymethylene in 55 ml. of a solution analyzing 63.5% by weight of formaldehyde. This final portion was agitated at 105° C. for 0.83 day. The Equilibrium Concentration for the system used in all three of the above steps at 105° C. was 62%. The polyoxymethylene product recovered from a 10 ml. sample after this final step weighed 1.180 grams and had a number average molecular weight of 39,000. This product was treated with acetic anhydride in the presence of sodium acetate to produce a polyoxymethylene diacetate having a reaction rate constant for thermal degradation at 222° C. of 0.11% by weight per minute.

*Example 9*

A solution was prepared containing 67.4% by weight of formaldehyde in a mixture of ethylene glycol, N-ethylpiperidine, and acetic acid in the same weight proportions as described in Example 8. The pH of this solution was about 7.2. A portion (5 ml.) of this solution was agitated at 60° C. for 30 minutes and then at 85° C. for 10 minutes to produce a slightly cloudy solution, indicating the presence of small polyoxymethylene particles. To this slightly cloudy solution was added 50 ml. of a solution of 73.2% formaldehyde in a mixture of 1.0 part by weight of methanol/0.12 part by weight of N-ethylpiperidine/0.0848 part by weight of glacial acetic acid. The formaldehyde concentration of the resulting mixture was 72.7%. This mixture was agitated at 105° C. for 1.0 day. The Equilibrium Concentration for this mixture at 105° C. was approximately 69%. The polyoxymethylene was isolated from this mixture and found to weight 1.280 grams and to have a number average molecular weight of 18,000.

*Example 10*

In a manner similar to that described in Example 4 (employing a reaction medium of formaldehyde, methanol, N-ethylpiperidine, and acetic acid) a polyoxymethylene was prepared having a number average molecular weight of 13,000. This polymer, in the amount of 0.91 gram, was placed in 56.8 ml. of a solution of 42.2% by weight of formaldehyde in a mixture of 1.0 part by weight of benzyl alcohol/0.12 part by weight of N-ethylpiperidine/0.0848 part by weight of glacial acetic acid. This latter solution had a pH of 6.7. This mixture was agitated at 105° C. for 0.97 day. The Equilibrium Concentration for this mixture at 105° C. was about 40% by weight of formaldehyde. The polyoxymethylene product was isolated and found to weight 1.620 grams and to have a number average molecular weight of 19,000.

*Example 11*

A clear solution was prepared at 105° C. containing 75.0% by weight of formaldehyde dissolved in a mixture of 1.0 part of methanol to 0.12 part of N-ethylpiperidine. This solution had a pH of 8.3–8.6. This solution (50 ml.) was cooled to 60° C. for 1.5 minutes, which caused the solution to become slightly cloudy with polyoxymethylene seed particles. The 50 ml. solution containing dispersed seed particles was then gently agitated at a temperature of 105° C. for 0.95 day. The formaldehyde concentration in the solution at the end of this period was about 70.3%. The Equilibrium Concentration of this solution at 105° C. was 69.2%. There was recovered from the solution dispersed particles of polyoxymethylene in the amount of 8.16 grams and having a number average molecular weight of 16,000.

*Example 12*

A clear solution was prepared at 105° C. containing 75.6% by weight of formaldehyde dissolved in a mixture of 0.105 part of di-n-propylamine to 1.0 part of methanol. This solution had a pH of 8.0–8.2. This solution (50 ml.) was cooled to 60° C. for 2.0 minutes which caused the solution to become slightly cloudy with polyoxymethylene seed particles. The 50 ml. solution containing dispersed seed particles was then gently agitated for 0.85 day at 105° C. The formaldehyde concentration of the solution at the end of this period was 73.1%. The Equilibrium Concentration of this solution was about 70% formaldehyde. The polyoxymethylene recovered from the 50 ml. solution weighed 5.05 grams and had a number average molecular weight of 15,000.

*Example 13*

A clear solution was prepared containing 72.6% by weight of formaldehyde dissolved in a mixture of 0.108 part of cyclohexylamine to 1.0 part of methanol. This solution had a pH of 7.3. This solution (55 ml.) was cooled to 60° C. for 5.0 minutes, which caused the solution to become slightly cloudy with polyoxymethylene seed particles. The 55 ml. solution containing dispersed seed particles was then gently agitated for 1.02 days at 105° C. The Equilibrium Concentration of this solution at 105° C. was about 70% formaldehyde. The polyoxymethylene recovered from the 55 ml. solution weighed 7.79 grams and had a number average molecular weight of 17,000.

We claim:

1. The process of polymerizing an alcoholic solution of formaldehyde which comprises forming a starting solution of formaldehyde, an alcohol, and a non-aromatic amine free of carbonyl groups and of nitro groups and having a $pK_b$ of less than 7 as a polymerization catalyst, the pH of said starting solution being from 3.5 to 10.0, adjusting the temperature, pressure and formaldehyde concentration of said solution such that the said concentration is from 25%–85% by weight of formaldehyde based on the total weight of alcohol and formaldehyde, and the said solution is sufficiently supersaturated with respect to formaldehyde that polyoxymethylene seed particles form spontaneously therein, maintaining that supersaturated condition until said solution becomes visibly cloudy with seed particles, placing said seed particles in a reaction medium comprising formaldehyde, alcohol and and a non-aromatic amine free of carbonyl groups and of nitro groups and having a $pK_b$ of less than 7, the temperature of said reaction medium being from 60° C. to 125° C., the pH of said reaction medium being from 3.5–10, the formaldehyde concentration of said reaction medium, at the reaction temperature and pressure, being from about 0.5% to about 7.0% greater than the weight percentage of formaldehyde required to saturate said reaction medium with respect to formaldehyde but less than the lowest concentration at which seed particles of polyoxymethylene form spontaneously therein, and maintaining the reaction temperature, pressure, and formaldehyde concentration of said reaction medium for a period of time sufficient for said seed particles to grow to a number average molecular weight of at least 15,000.

2. The process of claim 1 in which the reaction temperature of said starting solution during the formation of said seed particles is substantially the same as the temperature of said reaction medium, and in which said amine is a tertiary amine.

3. The process of claim 1 in which the spontaneous formation of polyoxymethylene seed particles is effected by lowering the temperature of said starting solution and in which said amine is a tertiary amine.

4. The process of polymerizing formaldehyde dissolved in an alcohol to a polyoxymethylene having a number average molecular weight of at least 15,000, which comprises forming a starting solution having a pH of 3.5–10.0 and consisting essentially of formaldehyde, an aliphatic alcohol having 1–5 carbon atoms per molecule, and a polymerization catalyst which is non-reactive with formaldehyde under the reaction conditions to form substantial amounts of irreversible by-products, said catalyst comprising a tertiary amine having a $pK_b$ of less than 7 and an acid having a $pK_a$ for any hydrogen on said acid of at least 2, the amount of said catalyst being present in the amount of 0.1%–20% by weight of said solution, the concentration of formaldehyde in said starting solution being from 25%–85% based on the weight of alcohol and formaldehyde, adjusting the temperature of said starting solution so as to cause the solution to be sufficiently supersaturated with respect to formaldehyde that polyoxymethylene seed particles form spontaneously therein, maintaining that supersaturated condition until said solution becomes visibly cloudy with seed particles, placing said seed particles in a reaction medium maintained at a temperature of 60°–110° C., and comprising formaldehyde, an aliphatic alcohol having 1–5 carbon atoms per molecule, and said catalyst, the formaldehyde concentration and the temperature of said reaction medium being adjusted so that the reaction medium is supersaturated with respect to formaldehyde in the amount of from about 0.5% to about 7.0% greater than the weight percentage required for saturation but less than the lowest concentration at which polyoxymethylene seed particles form spontaneously therein, adjusting the reaction temperature and formaldehyde concentration so as to gradually lower the formaldehyde concentration in the reaction medium such that the amount of formaldehyde super-saturation becomes less and less as the polyoxymethylene seed particles increase in molecular weight, and recovering polyoxymethylene having substantially 100% crystallinity and having a number average molecular weight of at least 15,000.

5. The process of claim 4 in which the catalyst is a mixture of a tertiary amine and phosphoric acid.

6. The process of claim 4 in which the catalyst is a mixture of a tertiary amine and an unsubstituted aliphatic carboxylic acid having 1–10 carbon atoms per molecule.

7. The process of polymerizing an alcoholic solution of formaldehyde to a high molecular weight polyoxymethylene which comprises forming a starting solution having a pH of 3.5–10 and consisting essentially of 25%–85% of formaldehyde, based on the weight of formaldehyde and alcohol, an aliphatic alcohol having 1–5 carbon atoms per molecule, 25%–300% by weight of formaldehyde plus said alcohol of an organic liquid diluent which has an atmospheric boiling point above 100° C. and which is completely miscible and non-reactive with the other reaction ingredients, and 1%–10% by weight of said starting solution of a non-aromatic tertiary amine having a $pK_b$ of 3–5, said tertiary amine being non-reactive with formaldehyde to cause any substantial amount of irreversible by-products, adjusting the temperature of said starting solution so as to cause the solution to be sufficiently supersaturated with respect to formaldehyde that polyoxymethylene seed particles form spontaneously therein, maintaining that supersaturated condition until said solution becomes visibly cloudy with seed particles, placing said seed particles in a reaction medium consisting essentially of the same components as in said starting solution, adjusting the formaldehyde concentration and the temperature of said reaction medium at some point between 60° C. and 125° C. such that the reaction medium is supersaturated with respect to formaldehyde in the amount of from about 0.5% to about 7.0% greater than the weight percentage required for saturation but less than the lowest concentration at which polyoxymethylene seed particles form spontaneously therein, adjusting the reaction temperature and formaldehyde concentration so as to gradually lower the formaldehyde concentration within the supersaturation range as the polyoxymethylene seed particles increase in molecular weight, and recovering a polyoxymethylene which is substantially 100% crystalline and which has a number average molecular weight of at least 15,000.

8. The process of claim 7 in which the organic liquid diluent is an ether.

9. The process of claim 7 in which the organic liquid diluent is an aromatic hydrocarbon.

References Cited in the file of this patent

UNITED STATES PATENTS

| 2,734,889 | Starr | Feb. 14, 1956 |
| 2,768,994 | MacDonald | Oct. 30, 1956 |

OTHER REFERENCES

Walker: "Formaldehyde," A.C.S. Monograph No. 120 (1953), pp. 46, 47, 75, 76, 117 and 145.